United States Patent
Ma et al.

(10) Patent No.: US 10,242,049 B2
(45) Date of Patent: Mar. 26, 2019

(54) METHOD, SYSTEM AND STORAGE MEDIUM FOR IMPLEMENTING INTELLIGENT QUESTION ANSWERING

(71) Applicant: BAIDU ONLINE NETWORK TECHNOLOGY (BEIJING) CO., LTD., Beijing (CN)

(72) Inventors: Yanjun Ma, Beijing (CN); Guohua Li, Beijing (CN); Xingwu Sun, Beijing (CN); Xingjian Li, Beijing (CN); Weimeng Zhang, Beijing (CN); Haojie Wei, Beijing (CN); Meng Liao, Beijing (CN); Ming Zong, Beijing (CN); Xijuan Zhang, Beijing (CN); Hua Wu, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/119,691

(22) PCT Filed: Aug. 5, 2015

(86) PCT No.: PCT/CN2015/086094
§ 371 (c)(1),
(2) Date: Aug. 17, 2016

(87) PCT Pub. No.: WO2016/112679
PCT Pub. Date: Jul. 21, 2016

(65) Prior Publication Data
US 2017/0308531 A1 Oct. 26, 2017

(30) Foreign Application Priority Data

Jan. 14, 2015 (CN) .......................... 2015 1 0017563

(51) Int. Cl.
*G06F 17/30* (2006.01)
*G06N 5/02* (2006.01)

(52) U.S. Cl.
CPC .......... *G06F 17/3043* (2013.01); *G06F 17/30* (2013.01); *G06F 17/3053* (2013.01);
(Continued)

(58) Field of Classification Search
CPC . G06F 17/2785; G06F 17/3053; G06F 17/271
See application file for complete search history.

(56) References Cited

U.S. PATENT DOCUMENTS 5,109,509 A * 4/1992 Katayama ............. G06F 17/271
704/9
6,760,320 B1 7/2004 Bune
(Continued)

FOREIGN PATENT DOCUMENTS

CN 101373532 2/2009
CN 103914543 A 7/2014
(Continued)

OTHER PUBLICATIONS

Written Opinion and International Search Report dated Nov. 3, 2015 for International Application No. PCT/CN2015/086094 (English translation) in 9 pages.
(Continued)

*Primary Examiner* — Hung Q Pham
(74) *Attorney, Agent, or Firm* — Knobbe Martens Olson & Bear LLP

(57) ABSTRACT

Embodiments of the present invention provide a method, system and storage medium for implementing intelligent question answering. The method includes: receiving a query question; performing a semantic analysis of the question; performing corresponding search processing for the question based on a result of the semantic analysis, wherein the
(Continued)

search processing includes search processing performed for the question by at least one of a semantic relationship mining system, a text library search system, a knowledge base search system, and a question and answer library search system; and returning an answer based on a result of the search processing. In this way, the accuracy of answers to the questions is effectively improved.

12 Claims, 5 Drawing Sheets

(52) U.S. Cl.
CPC .. *G06F 17/30539* (2013.01); *G06F 17/30545* (2013.01); *G06F 17/30604* (2013.01); *G06F 17/30654* (2013.01); *G06N 5/022* (2013.01)

(56) References Cited

U.S. PATENT DOCUMENTS

| | | | |
|---|---|---|---|
| 7,827,125 B1* | 11/2010 | Rennison | G06F 17/3066 706/14 |
| 2009/0287678 A1 | 11/2009 | Brown et al. | |
| 2010/0318558 A1* | 12/2010 | Boothroyd | G06F 17/30731 707/769 |
| 2011/0213796 A1 | 9/2011 | Kiyota et al. | |
| 2011/0301941 A1 | 12/2011 | De Vocht | |
| 2012/0221324 A1 | 8/2012 | Machii et al. | |
| 2013/0260358 A1* | 10/2013 | Lorge | G06F 17/30734 434/362 |
| 2014/0358890 A1* | 12/2014 | Chen | G06F 17/30867 707/710 |

FOREIGN PATENT DOCUMENTS

| | | |
|---|---|---|
| CN | 10410272 A | 10/2014 |
| CN | 104102721 | 10/2014 |
| CN | 104102721 A | 10/2014 |
| CN | 104199965 A | 12/2014 |
| CN | 104216913 | 12/2014 |
| CN | 104252533 | 12/2014 |
| CN | 104573028 A | 4/2015 |
| JP | 2010009471 A | 1/2010 |

OTHER PUBLICATIONS

International Search Report for Application No. PCT/CN2015/086094 dated Nov. 3, 2015 in 4 pages.

Search Report dated Nov. 3, 2017 in European Application No. 15877593.

* cited by examiner

METHOD, SYSTEM AND STORAGE MEDIUM FOR IMPLEMENTING INTELLIGENT QUESTION ANSWERING

CROSS REFERENCE TO RELATED APPLICATIONS

This application claims priority to Chinese Patent Application No. 201510017563.6 filed by Baidu Online Network Technology (Beijing) Co., Ltd. on Jan. 14, 2015, and entitled "Method and System for Implementing Intelligent Question Answering," which is incorporated herein by reference in its entirety.

TECHNICAL FIELD

Embodiments of the present invention relate to the field of information query technologies, and specifically to a method, system and storage medium for implementing intelligent question answering.

BACKGROUND

An intelligent question answering (QA) system is an intelligent system based on reasoning from massive Internet data and thorough semantic language understanding. Intelligent QA systems not only can answer knowledge questions, but also can be applied to various fields closely related to daily life, such as medical care, education, life, and science and technology, significantly increasing the information acquisition efficiency.

Existing intelligent QA systems are based mainly on questions and answers in communities, and return a user's answer with high similarity after mining historical data about users' questions and answers, and calculating similarity between a user's question and existing questions in a QA site.

The disadvantages of the above intelligent QA systems lie in that the intelligent QA systems relying on a QA site have low coverage of questions and cannot meet the users' requirement to answer moderately to less frequently and rarely asked questions. Answers provided by such systems are non-deterministic and not accurate enough.

SUMMARY

Embodiments of the present invention provide a method, system and storage medium for implementing intelligent question answering, so as to improve the accuracy of answers to the questions.

According to a first aspect, an embodiment of the present invention provides a method for implementing intelligent question answering, which comprises:

receiving a query question;

performing a semantic analysis of the question;

performing corresponding search processing for the question based on a result of the semantic analysis, the search processing comprising search processing performed for the question by at least one of a semantic relationship mining system, a text library search system, a knowledge base search system, and a question and answer library search system; and returning an answer based on a result of the search processing.

According to a second aspect, an embodiment of the present invention provides a system for implementing intelligent question answering, which comprises:

a central control system for receiving a query question;

a question analysis system for performing a semantic analysis of the question, the central control system being further configured to distribute, based on a result of the semantic analysis, the question to a corresponding back-end system for corresponding search processing, the back-end system comprising at least one of a semantic relationship mining system, a text library search system, a knowledge base search system, and a question and answer library search system, the central control system being further configured to return an answer based on a result of the search processing.

According to a third aspect, an embodiment of the present invention provides a non-volatile computer storage medium storing one or more modules which when executed by a device performing a method for implementing intelligent question answering, cause the device to perform operations comprising:

receiving a query question;

performing a semantic analysis of the question;

performing corresponding search processing for the question based on a result of the semantic analysis, wherein the search processing includes search processing performed for the question by at least one of a semantic relationship mining system, a text library search system, a knowledge base search system, and a question and answer library search system; and returning an answer based on a result of the search processing.

According to the method, system and storage medium for implementing intelligent QA that are provided in the embodiments of the present invention, a semantic analysis of a query question is performed, and based on the semantic analysis, corresponding search processing is performed for the question by using at least one of the semantic relationship mining system, the text library search system, the knowledge base search system, and the question and answer library search system, which broadens the search scope of answers to questions. Therefore, on one hand, answers to the question become more accurate; on the other hand, the coverage of questions is expanded. Even for moderately to less frequently asked questions and rarely asked questions, accurate answers can be obtained through search, so that the accuracy of answers to the questions is effectively improved.

BRIEF DESCRIPTION OF THE DRAWINGS

In order to better describe the technical solutions in the embodiments of the present invention, the drawings used in the embodiments will be briefly introduced below. It should be apparent that the drawings in the below description are merely embodiments of the present invention, and those of ordinary skill in the art may amend and replace the drawings without creative efforts.

DETAILED DESCRIPTION

The technical solutions of the embodiments of the present invention will be described clearly and completely below with reference to the accompanying drawings. It should be apparent that the described embodiments are some embodiments rather than all embodiments of the present invention, used for explaining the principle of the present invention, and not intended to limit the present invention to these specific embodiments. On the basis of the embodiments in the present invention, all other embodiments acquired by those of ordinary skill in the art without creative work fall within the scope of the present invention.

The methods of the embodiments of the present invention may be executed by a system for implementing intelligent QA that is configured to be implemented using hardware and/or software.

For the purpose of clarity, the network architecture of the system is introduced below with reference to FIG. 1a. The system includes: a central control system, a question analysis system, and a back-end system.

Figure 1A:
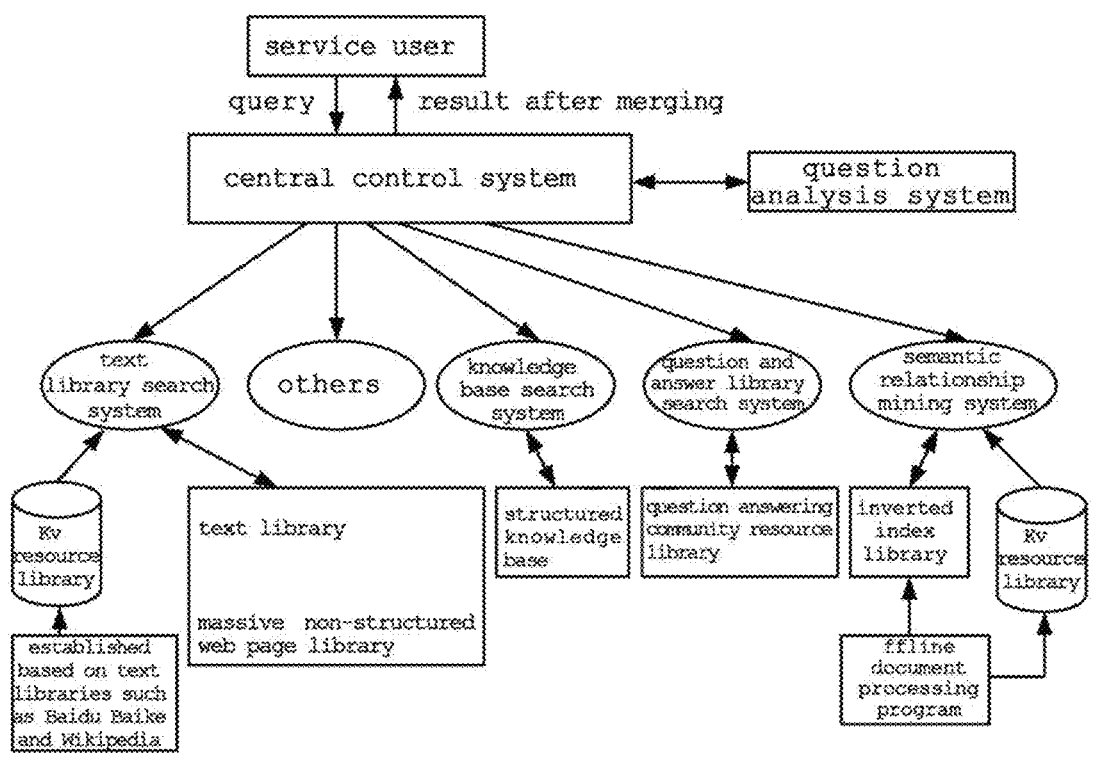
FIG. 1a is a schematic diagram of a network architecture of a system for implementing intelligent question answering (QA) to which a method for implementing intelligent QA of the embodiments of the present invention is applicable.

The central control system is used for receiving a query question (i.e., query in FIG. 1a). The central control system may receive, through a pre-defined text box, a query question that is input by a user, or may receive, through a pre-defined action button, a query question that is input by the user. For example, the central control system receives, through an action button for receiving a user voice, a voice that is input by the user, and performs voice recognition to obtain content corresponding to the input voice, which is used as the query question. The question analysis system is used for performing a semantic analysis of the question. The central control system is further used for distributing, based on a result of the semantic analysis, the question to a corresponding back-end system for corresponding search processing. The back-end system includes at least one of the following systems: a semantic relationship (Frame) mining system, a text library search system, a knowledge base search system, and a question and answer library search system. The central control system is further used for returning an answer based on the result of the search processing (i.e., the result after merging in FIG. 1a).

It should be noted that the central control system is the core control system of the system for implementing intelligent QA, and is responsible for receiving the query question; forwarding the question to the question analysis system; distributing, based on the result of the semantic analysis of the question analysis system and on the basis of a pre-set distribution policy, the question to a relevant back-end system for corresponding search processing, specifically to at least one of the semantic relationship mining system, the text library search system, the knowledge base search system, and the question and answer library search system for corresponding search processing; and returning an answer based on the result of the search processing, so as to enable a front-end user of the central control system to know the answer corresponding to the query question, thereby implementing intelligent QA.

Different back-end systems correspond to different resource libraries, which will be described in details in the following embodiments. In addition, the distribution policy will also be described hereinafter.

First Embodiment

Figure 1B:
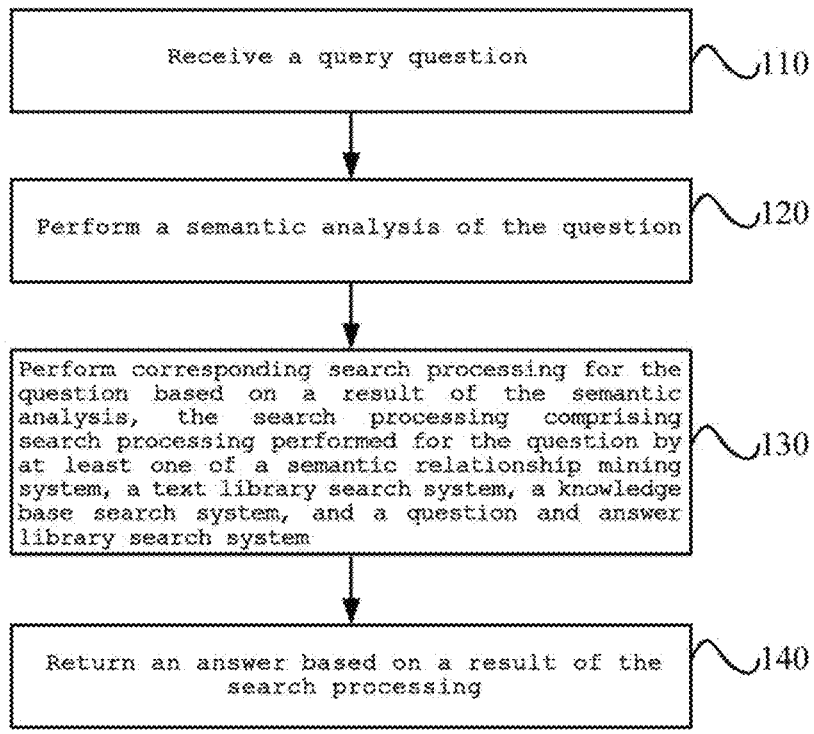
FIG. 1b is a flow chart of a method for implementing intelligent QA according to a first embodiment of the present invention.

Referring to FIG. 1b, a method for implementing intelligent QA provided by this embodiment includes: operations 110 to 140.

In the operation 110, a query question is received.

In this operation, the central control system receives a query question. The central control system may receive, through a text box that is pre-defined in a user interface, a query question that is input by a user, or may receive, through an action button that is pre-defined in a user interface, a query question that is input by the user. For example, the central control system receives, through an action button for receiving a user voice, a voice that is input by the user, and performs voice recognition to obtain content corresponding to the input voice, which is used as the query question.

It should be noted that the received query question may have comprehensive coverage. In other words, the received query question may be any question, i.e. the received query question may be a question of which the frequency of occurrence is relatively high and that is of interest to the user, or may be a question of which the frequency of occurrence is moderate or to which the answers provided by the current QA system are not satisfactory to the user, and may also cover rarely asked questions, i.e., questions of which the frequency of occurrence is very low.

In the operation 120, a semantic analysis of the question is performed.

This operation is performed by the question analysis system, and a basic lexical analysis of the question may be performed. The basic lexical analysis may include performing segmentation processing and part-of-speech-tagging processing on the question, and may further include determining the importance of a search term in the question, performing a dependency syntax analysis of the question, etc.

Dependency syntax was first proposed by a French linguist L. Tesniere in his work Elements of Structural Syntax in 1959, which has a profound effect on the development of linguistics. Dependency syntax analysis is an important branch of the syntax analysis in the natural language processing field. The dependency syntax analysis is to analyze a sentence to create a dependency syntax tree and describe the dependency relationship between phrases so as to reveal the syntactic structure of the sentence, and advocates that: the core verb in the sentence is the central element governing other elements, the core verb itself is not governed by any other element, and all the governed elements are subordinate to the governor on a certain dependency relationship.

In this operation, in addition to performing the basic lexical analysis of the question, the method may further preferably include identifying a focus, an opinion, and a type of the opinion of the question.

The focus of the question is a reference to the answer to the question, and may replace the answer to form a complete declarative sentence. For example, in the question "Who is the 2013 Wimbledon Women's Singles champion," the focus is "who". The focus of the question is mainly identified by using a rule, where the identification rule may be that if the question is a question with an interrogative, the focus of the question is the interrogative; or if the question is a question without an interrogative, the focus of the question is empty by default.

Identifying the opinion of the question refers to identifying the number of opinions of the question, i.e., the number of opinions contained in the question. The number of opinions of the question may be a general requirement. The number of opinions of a general requirement is generally greater than eight, or may be a specific number. For example, the number of opinions of the question "What are wild animals" is tens of thousands, respectively corresponding to different wild animals, and the opinion of the question is defined as a general requirement. For another example, the number of opinions of the question "Four Beauties in Ancient China" are four, because "Four" is mentioned in the question. As yet another example, the number of opinions of the question "Who is the 2013 Wimbledon Women's Singles champion" is one, because the champion is a single person in the context of the current question.

Identifying the type of the opinion of the question refers to identifying the type of the opinion that is needed by the user. For example, for the question "Who is the 2013 Wimbledon Women's Singles champion," the type of the opinion of the question is "champion." Methods for identifying the type of the opinion of the question are classified into two categories: rule-based identification methods and model learning models. In the rule-based identification methods, the type of the opinion is the word previous to the focus; in the model learning models, tools such as dependency syntax analysis are used as a basis to generate a training corpus and training model dynamics, so as to identify the type of the opinion of the question.

The method may further include, after the opinion type of the question is identified: performing normalization processing on the type of the opinion of the question.

Normalization of the type of the opinion of the question is to map the type of the opinion of the question to a fixed category system. For example, the question "Who is the 2013 Wimbledon Women's Singles champion," of which the focus is "who" and the type of the opinion is "champion," is normalized to the category "person." Methods for normalizing the type of the opinion of the question are generally based on an opinion rule or an opinion vocabulary.

In the operation 130, corresponding search processing is performed for the question based on the result of the semantic analysis, wherein the search processing includes search processing performed for the question by at least one of the semantic relationship mining system, the text library search system, the knowledge base search system, and the question and answer library search system.

As described above, this operation is executed by the central control system and a back-end system. Specifically, based on the result of the semantic analysis of the question analysis system and on the basis of a pre-set distribution policy, the question is distributed to a corresponding back-end system for corresponding search processing, specifically to at least one of the semantic relationship mining system, the text library search system, the knowledge base search system, and the question and answer library search system for corresponding search processing.

The various back-end systems described above may be used separately, or may be used in combination.

The distribution policy based on which the corresponding search processing is performed for the question based on the result of the semantic analysis may include:

performing search processing for the question by the semantic relationship mining system if the analyzed question has a structural dependency type (i.e., "previous sentence/next sentence" type); otherwise, performing search processing for the question by the text library search system, the knowledge base search system, and the question and answer library search system.

It should be noted that the search processing performed by the various back-end systems for the question is independent of each other.

Resource libraries corresponding to different back-end systems will be described below.

A resource library of the semantic relationship mining system may include two parts: an inverted index library, and a Kv (key value) resource library, both of which may be constructed by using an offline document processing program. Generally, there are many documents in a document set that contain a certain word, and each document records information such as a document number, the number of occurrences of the word in the document, and positions at which the word appears in the document. Such information related to one document is referred to as inverted indexes. The search efficiency can be improved by using inverted indexes. The Kv resource library may contain mined poem resources, lyric resources, etc., and is used for processing dependency-type questions.

A resource library of the text library search system may include: a text library and a Kv resource library. The text library is established on the basis of the search engine technology to index, analyze and rank massive non-structured web pages, and based on the massive non-structured web page data. The Kv resource library is established based on libraries such as Baidu Baike and Wikipedia. Because massive non-structured web page data and the libraries such as Baidu Baike and Wikipedia contain extensive knowledge, the text library search system is the core of the entire back-end system, that is, a core processing system for implementing intelligent QA, which can implement the search of answers to the query question that is input by the user.

A resource library of the knowledge base search system may be a structured offline mining knowledge base, which is stored in the form of a triplet <entity, attribute, value>, for example, <Zhang San, wife, beautiful girl>, <beautiful girl, constellation, Aries>, or <Avatar, author, James Cameron>, and is responsible for reasoning on the basis of information in the knowledge base. For example, for the question "What is the constellation of Zhang San's wife?" it can be reasoned from Zhang San's wife being a beautiful girl and the constellation of a beautiful girl being Aries that the answer to the question is "Aries."

A resource library of the question and answer library search system may be a QA community resource library formed on the basis of offline mined high-quality QA data, for example, historical questions and answers of users in Baidu Zhidao. The processing procedure of the question and answer library search system is similar to that of the text library search system, and the specific processing procedure of the text library search system will be described in details in the following third embodiment.

In the operation 140, an answer is returned based on the result of the search processing.

According to the technical solution of this embodiment, a semantic analysis of a query question is performed, and based on the semantic analysis, corresponding search processing is performed for the question by using at least one of the semantic relationship mining system, the text library search system, the knowledge base search system, and the question and answer library search system, which broadens the search scope of answers to questions. Therefore, on one hand, answers to the question become more accurate; on the other hand, the coverage of questions is expanded. Even for moderately to less frequently asked questions and rarely asked questions, accurate answers can be obtained through search, so that the accuracy of answers to the questions is effectively improved.

The method for implementing intelligent QA that is provided by this embodiment of the present invention may be executed by a cloud system, embedded in a robot of any external shape, and is applicable to any QA scenario. For example, the method is applicable to tutoring: students encountering unfamiliar knowledge points can directly communicate with a system for implementing intelligent QA to acquire more comprehensive, real and useful information, for example, "Who proposed the Law of Gravity? What is the meaning of the proposal of the Law of Gravity." For another example, the method is applicable to providing an automatic customer service in public places: when a customer is in a shopping mall or is choosing clothes, she interacts with a system for implementing intelligent QA to learn which one of natural fiber and synthetic fiber is better and learn their respective advantages and disadvantages; or when visiting a park, a tourist interacts with a system for implementing intelligent QA to learn information such as the flowering season of roses. For yet another example, the method is applicable to supplementary medical treatment: combining big data on the Internet and case information of users, and through analysis and reasoning by using a system for implementing intelligent QA, an etiological analysis is provided for reference.

Exemplarily, performing corresponding search processing for the question based on the result of the semantic analysis includes:

performing search processing for the question by the semantic relationship mining system if the analyzed question has a structural dependency type; otherwise, performing search processing for the question by the text library search system, the knowledge base search system, and the question and answer library search system.

Exemplarily, performing search processing for the question by the semantic relationship mining system includes:

searching the ternary relationship library for an answer to the question.

Exemplarily, the ternary relationship library is established by:

performing a grammatical analysis of an original web page in a network to obtain a sentence having a dependency relationship;

extracting nodes of the dependency relationship to obtain a ternary relationship triple; and validating reasonableness of the ternary relationship triple, and establishing the ternary relationship library by using the ternary relationship triples the reasonableness of which is validated.

Exemplarily, the method further includes, before the sentence having the dependency relationship is obtained:

removing content in brackets in the sentence.

Exemplarily, the method further includes, before the ternary relationship triple is obtained:

adding at least one of a subject, an adverbial, and an object that the sentence having the dependency relationship lacks.

Exemplarily, performing search processing for the question by the text library search system includes:

performing a search to obtain a document set related to the question;

searching the document set for a candidate segment, wherein the candidate segment includes a candidate answer; and extracting the candidate answer from the candidate segment, and performing a first ranking operation.

Exemplarily, performing the first ranking operation includes:

performing ranking based on at least one feature of a uniform resource locator (URL) weight, an offset weight, and a question matching degree, wherein the URL weight is a weight of a URL link and a site to which a document where the candidate answer is located belongs, the offset weight is a distance coefficient of the candidate answer with respect to a keyword in the question in different candidate segments, and the question matching degree is a semantic matching degree between the candidate answer and the type of the opinion of the question.

Exemplarily, returning the answer based on the result of the search processing includes:

filtering the result of the search processing by using intra-domain knowledge; and returning the answer based on the result of the filtering.

Exemplarily, returning the answer based on the result of the filtering includes:

performing a second ranking operation of the result of the filtering; and returning the ranked result of the filtering.

Exemplarily, performing the second ranking operation of the result of the filtering includes:

ranking the result of the filtering by using a supervised machine learning model.

Exemplarily, returning the answer based on the result of the filtering includes:

performing a third ranking operation of the result of the filtering; and returning the ranked result of the filtering.

Exemplarily, performing the third ranking operation of the result of the filtering includes:

validating the matching degree between the candidate answer and the question; and ranking the candidate answers based on the matching degrees.

Second Embodiment

On the basis of the above embodiment, this embodiment provides a technical solution of another method for implementing intelligent QA.

Figure 2A:
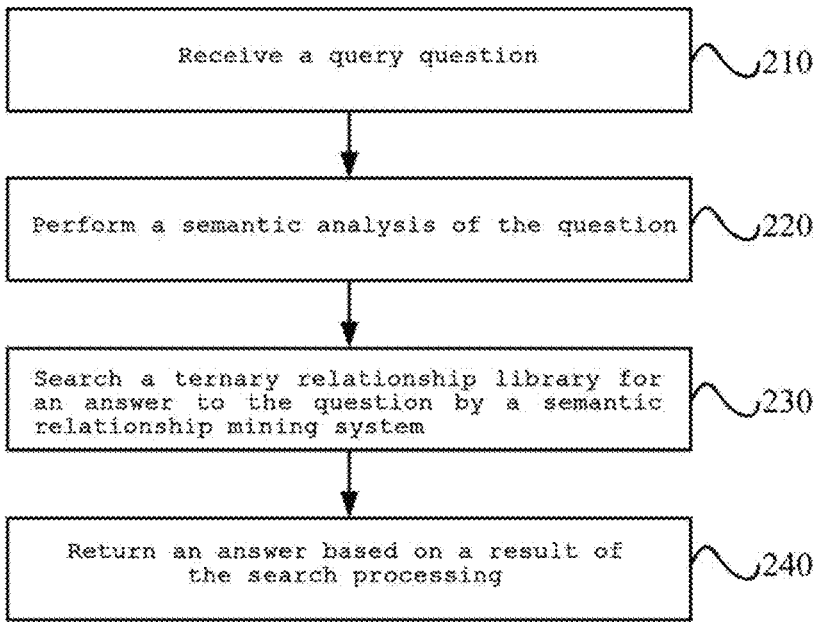
FIG. 2a is a flow chart of a method for implementing intelligent QA according to a second embodiment of the present invention.

Referring to FIG. 2a, the method for implementing intelligent QA provided by this embodiment specifically includes: operations 210 to 240.

In the operation 210, a query question is received.

In the operation 220, a semantic analysis of the question is performed to know that the type of the opinion of the question is "previous sentence" or "next sentence."

This operation is also applicable to the operation of performing a basic lexical analysis of the question and the operation of identifying a focus, an opinion, and a type of the opinion of the question in the foregoing embodiment, which will not be repeatedly described herein.

In the operation 230, the semantic relationship mining system searches the ternary relationship library for an answer to the question.

In this operation, ternary relationships in the ternary relationship library encompass dependency relationships using a verb as the core, dependency relationships between entities and attributes and dependency relationships between different entities, and the ternary relationships in the ternary relationship library have passed a reasonableness validation.

Figure 2B:
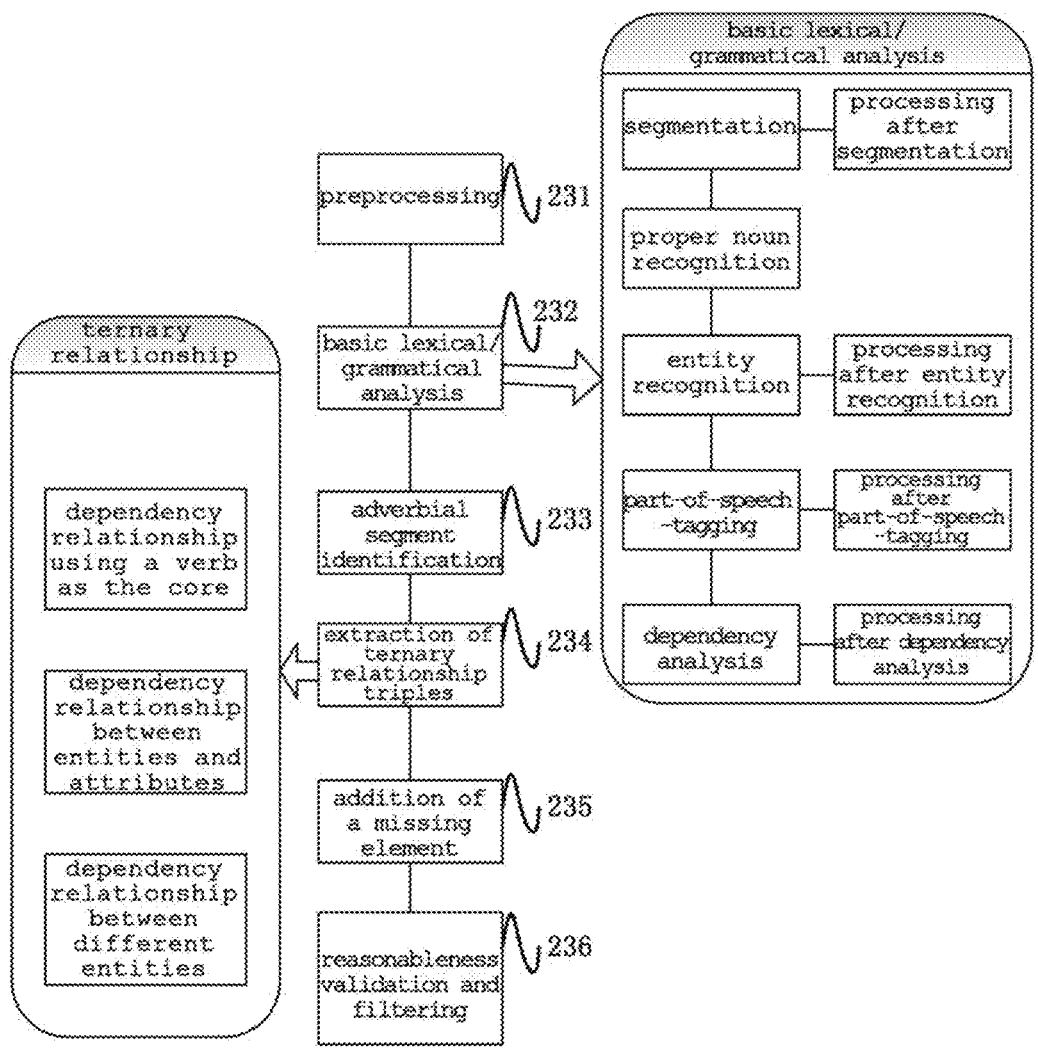
FIG. 2b is a flow chart of establishing a ternary relationship library in the method for implementing intelligent QA according to the second embodiment of the present invention.

Referring to FIG. 2b, the ternary relationship library is established preferably by: operations 231 to 236.

In the operation 231, preprocessing is performed.

Content in brackets such as "( )" in sentences is removed, so as to avoid affecting the structure of dependency syntax analysis.

In the operation 232, a basic lexical/grammatical analysis is performed.

Segmentation, proper noun recognition, entity recognition, part-of-speech-tagging and dependency analysis may be performed on a sentence part contained in the text in an original web page, so as to obtain a sentence having a dependency relationship.

In the operation 233, adverbial segment identification is performed.

For example, segment type identification is performed on segments separated by commas, which are mainly classified into time adverbial segments, non-time adverbial segments and other segments.

In the operation 234, ternary relationship triples are extracted.

Specifically, this operation is to perform relationship extraction based on each parent node of dependency analysis, to obtain ternary relationship triples. The ternary relationship triples specifically include: dependency relationships using a verb as the core, dependency relationships between entities and attributes and dependency relationships between different entities. For example, in the sentence "Student A wins an award," between "Student A" and "award" there is a dependency relationship using a verb as the core; in the sentence "Huangshan Mountain is very beautiful," between "Huangshan Mountain" and "very beautiful" there is a dependency relationship between the entity and the attribute; the next sentence after "The sun beyond the mountains glows" is "The Yellow River seawards flows," which may be construed as a dependency relationship between different entities.

In the operation 235, a missing element is added.

For example, a subject, a time/location adverbial, or an object is added.

In the operation 236, reasonableness validation and filtering are performed.

It is determined whether the ternary relationship triples obtained through analysis are reasonable. If a ternary relationship triple is not reasonable, the ternary relationship triple will not be kept. That is, filtering is performed on the ternary relationship triples obtained through analysis, so that only ternary relationship triples that are reasonable, i.e., ternary relationship triples that have passed the validation, are kept. Then, the ternary relationship library is established by using the ternary relationship triples that have passed the validation.

For example, "The Yellow River seawards flows, the sun beyond the mountains glows" is extracted from an original web page, and it has been obtained in the operation 233 through extraction according to the original web page that "The Yellow River seawards flows" is the previous sentence of "the sun beyond the mountains glows." In this case, it can be determined based on existing poem resources that this ternary relationship triple is not reasonable, and therefore, the ternary relationship triple is filtered out.

In the operation 240, an answer is returned based on the result of the search processing.

In the technical solution of this embodiment, a semantic analysis of a query question is performed, and based on the semantic analysis, corresponding search processing in a ternary relationship library is performed for the question by using the semantic relationship mining system, so as to find an answer to the question. Because ternary relationships in the ternary relationship library encompass dependency relationships using a verb as the core, dependency relationships between entities and attributes and dependency relationships between different entities, the search scope of answers to questions is increased, and therefore the coverage of questions is expanded. Even moderately to less frequently asked questions and rarely asked questions can be covered. In addition, because the ternary relationships in the ternary relationship library have passed reasonableness validation, answers to questions become more accurate.

It should be noted that in the process of setting up the ternary relationship library, the method may further include, before the ternary relationship triples are obtained: adding at least one of a subject, an adverbial, and an object that the sentences having the dependency relationship lack.

Specifically, segment types of the sentences having the dependency relationship may be identified, which include: subjects, predicates, objects, adverbials, etc., where the adverbials may be further classified into the following types: time adverbials, location adverbials, reason adverbials, and result adverbials. Verbs act as the predicates. As described above, the dependency syntax analysis is to analyze a sentence to obtain a dependency syntax tree so as to describe the dependency relationship between phrases, and thus the syntactic structure of the sentence is revealed. The dependency syntax analysis advocates that: the core verb in the sentence is the central element governing other elements, the core verb itself is not governed by any other element, and all the governed elements are subordinate to the governor on a particular dependency relationship. The dependency relationship using a verb as the core refers to a dependency relationship between the predicate and segments of other types.

In this manner, adding other elements than the predicates that the sentences having the dependency relationship lack can help enrich dependency relationships using a verb as the core in the ternary relationships, thereby further broadening the search scope of answers to questions, and further expanding the coverage of questions. Even moderately frequently and less frequently asked questions and rarely asked questions can be covered.

Third Embodiment

On the basis of the first embodiment, in this embodiment, the operation of performing corresponding search processing for the question based on the result of the semantic analysis is optimized to be: performing search processing for the question by the text library search system based on the result of the semantic analysis.

Figure 3:
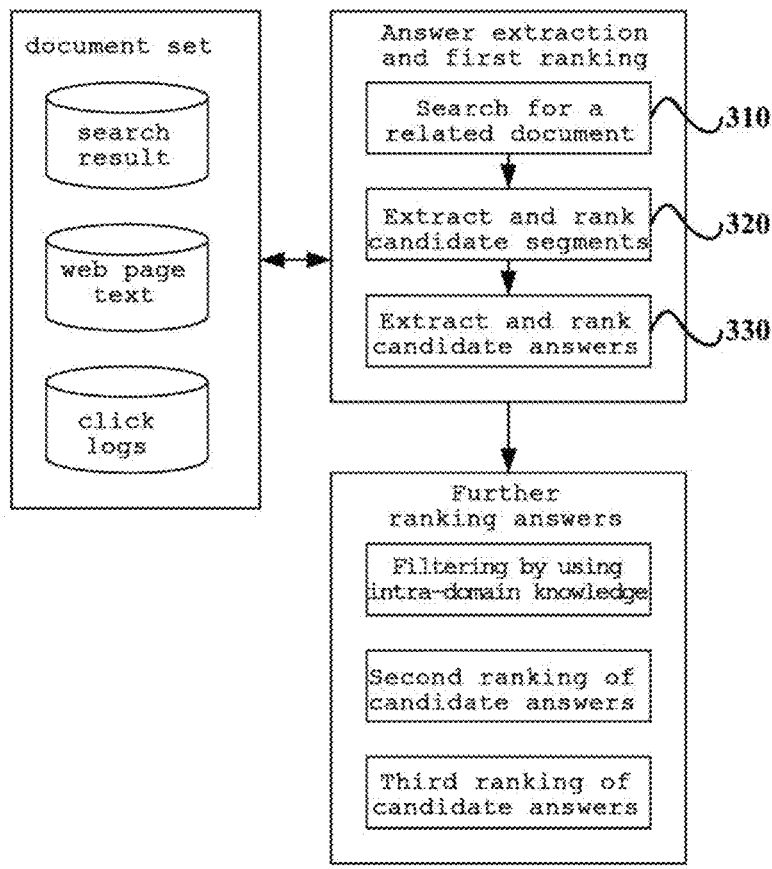
FIG. 3 is a flow chart of performing search processing for a question by a text library search system in a method for implementing intelligent QA according to a third embodiment of the present invention.

Referring to FIG. 3, a flowchart of performing search processing for a question by a text library search system in a method for implementing intelligent QA according to a third embodiment of the present invention is shown. The method specifically includes: operations 310 to 330.

In the operation 310, a related document is searched for.

A search is performed in a resource library to obtain a search result, a web page text, and click logs, and a document set related to the question is obtained through the search.

In this operation, the question may be searched for by using a search engine, to retrieve a related web page set as a document set related to the question. Correlation ranking by the search engine reflects the importance level of each document to some extent. Specifically, the question may be searched for by using the search engine, to obtain search results and other resources related to the question which may include a digest, a Uniform Resource Locator (URL), document click data, document text information, etc. Then, document content corresponding to a web page is acquired and retrieved according to the URL, which is used for performing a deep analysis of the questions and answers. The satisfaction level of each document for the question is analyzed through click logs.

The click log is used to evaluate, based on the level of the URL, the satisfaction level of each clicked document for the question.

The method may further include performing preprocessing, to merge resources that are substantially the same but are expressed using different methods, for example, time "March 2010" and "2010. 03;" and to correct resources that are incorrectly expressed.

Preferably, the method may further include document correlation calculation and document ranking.

The document correlation may be calculated based on features such as semantic similarity. Calculation of the semantic similarity refers to calculating the value of similarity between the question and document titles. The method for semantic calculation mainly uses information, such as, the importance of the search term, replacement of the search term with synonyms, modification of the search term, etc., for calculation.

The document correlation ranking refers to that the search engine retrieves a large number of web page documents based on the search term in the question without limiting its escape risk. In the document correlation ranking method, correlation re-ranking is performed based on the search and ranking result of the search engine (for example, Baidu search engine) and the user satisfaction levels of web pages analyzed in the click logs, and in combination of features such as semantic similarity calculation, so as to solve the content escape problem. Content escape may introduce noise data, resulting in extraction of incorrect answers or in that incorrect answers have a high ranking in the ranking phase.

In the operation 320, candidate segments are extracted and ranked.

The document set is searched for candidate segments, wherein the candidate segments include candidate answers.

First, each document may be segmented. The document segmentation generally takes paragraph or multiple sentences as a unit. Then, a set keyword is searched for in each document so as to obtain segments corresponding to the set keyword as candidate segments, which are further used for locating candidate answers.

The candidate segments may further be ranked. Specifically, the confidence of the candidate segment is calculated based on features such as the correlation weight of a source document, content similarity of the candidate segment, and correlation of the candidate segment, and the candidate segments are ranked based on the confidence.

The correlation weight of the source document may be calculated by linear fitting of related features of document correlation re-ranking. The content similarity of the candidate segment is used for calculating content similarity between the question and the candidate segment, and may be calculated by using the semantic similarity calculation method. Calculation of the correlation of the candidate segment is used for measuring the correlation between the question and the candidate segment, and the calculation method is mainly to fit features such as the importance of each search term in the question, the number of hits and the positions of hits of each search term in the candidate segment, etc.

In the operation 330, candidate answers are extracted and ranked.

The candidate answers are extracted from the candidate segments, and a first ranking operation is performed.

In this operation, the operation of extracting candidate answers may be implemented by means of the named entity recognition technology using an offline mined open-domain dictionary. The open-domain dictionary is a comprehensive dictionary.

The first ranking operation is preferably to perform ranking based on at least one feature of a URL weight, an offset weight, and a question matching degree, wherein the URL weight is a weight of a URL link and a site to which a document where the candidate answer is located belongs, the offset weight is a distance coefficient of the candidate answer with respect to a keyword in the question in different candidate segments, and the question matching degree is a semantic matching degree between the candidate answer and the type of the opinion of the question.

Alternatively, the first ranking operation may be performed on the candidate answers based on co-occurrence weights of the candidate answers and the keyword in the question.

In addition, the first ranking operation may alternatively be performed on the candidate answers based on at least one of the following features: the position of occurrence of the candidate answer in the candidate segment, inverse document frequency of the candidate answer in the search result, the correlation of the source document, the correlation of a source candidate segment, and confidence-weighted voting weights of different candidate segments for a same answer (including answers having a same meaning).

The correlation of the source document may be obtained by linear fitting of related features of the document correlation re-ranking; the correlation of the source candidate segment may be obtained by linear fitting of the correlation of the source document and the semantic matching degree between the source segment and the question.

The first ranking operation on the candidate answers is mainly for the purpose of ensuring the retrieve of the candidate answers, and avoiding excessive answers to be ranked in a second ranking operation affecting the ranking performance and noise control.

It should be noted that the method may further include, after the candidate answers are extracted and ranked: further ranking the candidate answers, for example, filtering by using intra-domain knowledge, a second ranking operation, a third ranking operation, which will be described in details in conjunction with the following embodiments.

Fourth Embodiment

On the basis of the above embodiments, this embodiment provides a preferable solution for the operation of returning an answer based on the result of the search processing.

Figure 4:
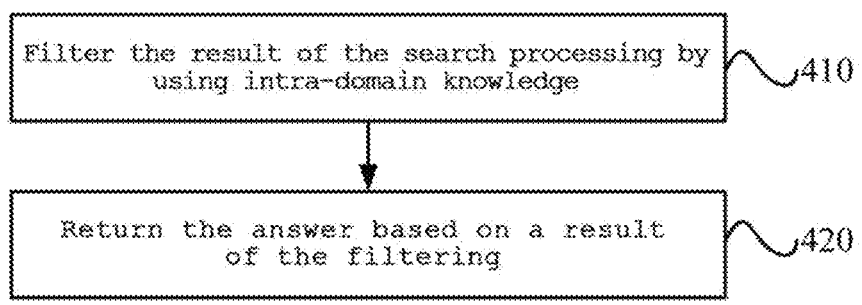
FIG. 4 is a flow chart of returning an answer according to a search process result in a method for implementing intelligent QA according to a fourth embodiment of the present invention.

Referring to FIG. 4, a flow chart of returning an answer based on the result of search processing in a method for implementing intelligent QA according to the fourth embodiment of the present invention is shown. The method specifically includes: operations 410 to 420.

In the operation 410, the result of the search processing is filtered by using intra-domain knowledge.

Knowledge, features and ranking algorithms required by different questions and different types of answers differ. Therefore, the result of the search processing may be filtered by using knowledge of different domains, to obtain a search processing result matching the question.

Construction of domain knowledge is mainly construction of a precise domain knowledge dictionary. For example, golden retriever dog is a dog, and black dragon eye goldfish is a fish. If the type of the question is dog, the candidate answer "black dragon eye goldfish" will be filtered out by the domain dictionary.

Construction of the domain dictionary is mainly implemented by using algorithms such as site-oriented structured data mining (for example, mining novel entities from qidian.com), large-scale Internet unstructured/semi-structured data mining and verifying (for example, mining entities by using classification labels of a knowledge-type community such as Baike), or search logs mining (for example, mining Demi-Gods and Semi-Devils movie entities from search logs corresponding to the question "Demi-Gods and Semi-Devils Movie").

In the operation 420, the answer is returned based on the result of the filtering.

This operation may have multiple implementations, and is described by using the following implementations as examples.

In a first implementation, returning the answer based on the result of the filtering specifically includes:

performing a second ranking operation of the result of the filtering; and returning the ranked result of the filtering.

The second ranking operation may be performed on the result of the filtering by using a supervised machine learning model (for example, the GBRank machine learning model).

The machine learning model is obtained by learning and training statements containing ranked sample answers and corresponding ranking features, and may include at least one of the following ranking features: a question matching degree, offset weight, question-answer co-occurrence information, an answer boundary feature, and answer confidence.

The question matching degree is a semantic matching degree between the candidate answer and the type of the opinion of the question. The question matching degree is usually calculated by fitting the matching degree between an extended vector of the question and an extended vector of a candidate answer that are counted from a large scale corpus. The offset weight is a distance coefficient of the candidate answer with respect to a keyword in the question in different candidate segments. The question-answer co-occurrence information is used for measuring the importance level of the question in the primary context of the candidate answer. For the calculation of the entity-type question-answer co-occurrence information, the degree of co-occurrence may be calculated by using information of the candidate answer in Baidu Baike and the keyword in the question. The answer boundary feature refers to information about the left and right boundaries of the answer, for example, guillemet, quotation marks, or a Chinese back-sloping comma. The answer confidence is related to the source document. Each document is considered a source of evidence, and has one vote. Each source document votes once every time. Theoretically, a document with more votes has a higher answer confidence. Alternatively, the answer confidence may be determined based on the candidate segment to which the answer belongs. The document to which individual candidate segment belongs is considered a source of evidence and has one vote, and the weight of each vote of each source is determined by the correlation of the candidate segment. Theoretically, a document with more votes has a higher answer confidence.

This implementation may be used alone, or may be used in combination with the foregoing first ranking operation. Preferably, after the candidate answers are extracted from the candidate segments, the first ranking operation is performed, and the filtering operation is carried out by using intra-domain knowledge, the second ranking operation is performed on the result of the filtering.

In this preferable implementation, after the candidate answers are extracted from the candidate segments, the first ranking operation is performed by using at least one feature of the URL weight, the offset weight, and the question matching degree, thereby improving the accuracy of top ranked answers; answers corresponding to different categories of questions are filtered by using professional domain knowledge, thereby ensuring the professionalism and authority of answers corresponding to different categories of questions; the second ranking operation is performed on the result of the filtering by using at least one feature of the question matching degree, the offset weight, the question-answer co-occurrence information, the answer boundary feature and the answer confidence, thereby further improving the accuracy of top ranked answers while ensuring the professionalism and authority of the answers corresponding to the questions.

In a second implementation, returning the answer based on the result of the filtering specifically includes:

performing a third ranking operation on the result of the filtering; and returning the ranked result of the filtering.

Further, performing the third ranking operation on the result of the filtering preferably includes:

validating a matching degree between the candidate answers and the question; and ranking the candidate answers based on the matching degree.

Specifically, a secondary search may be used to validate the matching degree between the candidate answers and the question. The secondary search can provide richer information about match between the question and the answer, and refers to replacing the focus of the original question with the candidate answer, i.e., substituting the candidate answer into the original question to perform a secondary search, and collecting statistics on relevant information about the new question and the candidate answer, for example, whether the new question and the candidate answer appear successively in a document returned by the secondary search, co-occurrence information of the new question and the candidate answer, or information about hits of the keyword in the new question. If the title of a current document is a question-type title, the focus and the answer type are identified from the title of the document. If the question has no focus, the answer is added to the end of the original question and separated by a separator, and then the secondary search is performed.

This implementation may be used alone, or may be used in combination with the foregoing first ranking operation and/or the foregoing second ranking operation.

When this implementation is used alone, because the candidate answer is substituted into the original question to form a new question for which a secondary search is performed, the order in which the answers are arranged is optimized based on the relevant information about the new question and the candidate answer, so that the matching degree between top ranked answers and the original query question can be improved.

After the candidate answers are extracted from the candidate segments, the first ranking operation is performed, and the filtering operation is executed by using intra-domain knowledge, the second ranking operation and the third ranking operation are performed on the result of the filtering. In this implementation, after the candidate answers are extracted from the candidate segments, the first ranking operation is performed by using at least one feature of the URL weight, the offset weight, and the question matching degree, thereby improving the accuracy of top ranked answers; answers corresponding to different categories of questions are filtered by using professional domain knowledge, thereby ensuring the professionalism and authority of the answers corresponding to different categories of questions; the second ranking operation is performed on the result of the filtering by using at least one feature of the question matching degree, the offset weight, the question-answer co-occurrence information, the answer boundary feature and the answer confidence, thereby further improving the accuracy of top ranked answers while ensuring the professionalism and authority of the answers corresponding to the questions; the candidate answer is substituted into the original question to form a new question for which a secondary search is performed, and the order in which the answers are arranged is optimized based on the relevant information about the new question and the candidate answer, thereby further improving the matching degree between top ranked answers and the original query question.

Fifth Embodiment

Figure 5:
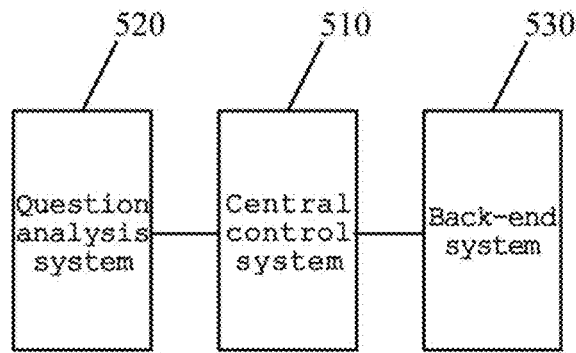
FIG. 5 is a schematic structural diagram of a system for implementing intelligent QA according to a fifth embodiment of the present invention.

This embodiment provides a system for implementing intelligent QA. Referring to FIG. 5, the system includes: a central control system 510, a question analysis system 520, and a back-end system 530.

The central control system 510 is configured to receive a query question; the question analysis system 52 is configured to perform a semantic analysis of the question; the central control system 510 is further configured to distribute, based on a result of the semantic analysis, the question to the corresponding back-end system 530 for corresponding search processing; the back-end system 530 includes at least one of the following systems: a semantic relationship mining system, a text library search system, a knowledge base search system, and a question and answer library search system; and the central control system 510 is further configured to return an answer based on a result of the search processing.

According to the technical solution of this embodiment, a semantic analysis of a query question is performed, and based on the semantic analysis, corresponding search processing is performed for the question by using at least one of the semantic relationship mining system, the text library search system, the knowledge base search system, and the question and answer library search system, which broadens the search scope of answers to questions. Therefore, on one hand, answers for the question become more accurate; on the other hand, the coverage of questions is expanded. Even for moderately to less frequently asked questions and rarely asked questions, accurate answers can be obtained through search.

In the above mentioned solution, the question analysis system 520 may be specifically configured to: identify a focus, an opinion, and a type of the opinion of the question.

Further, the question analysis system 520 may be further configured to, after identifying the type of the opinion of the question: perform normalization processing on the type of the opinion of the question.

In the above mentioned solution, the central control system 510 may be specifically configured to: distribute the question to the semantic relationship mining system for search processing if the analyzed question has a structural dependency type; otherwise, distribute the question to the text library search system, the knowledge base search system, and the question and answer library search system for search processing.

The semantic relationship mining system may be specifically configured to: search a ternary relationship library for an answer to the question.

The semantic relationship mining system may be further configured to:

perform a grammatical analysis of an original web page in a network to obtain a sentence having a dependency relationship;

extract nodes of the dependency relationship to obtain a ternary relationship triple; and validate reasonableness of the ternary relationship triples, and establish the ternary relationship library by using the ternary relationship triple the reasonableness of which is validated.

The semantic relationship mining system may be further configured to, before obtaining the sentence having the dependency relationship: remove content in brackets in the sentence.

The semantic relationship mining system may be further configured to, before obtaining the ternary relationship triple: add at least one of a subject, an adverbial, and an object that the sentence having the dependency relationship lacks.

The text library search system may be specifically configured to:

perform a search to obtain a document set related to the question;

search the document set for candidate segments, wherein the candidate segments include candidate answers; and extract the candidate answers from the candidate segments, and perform a first ranking operation.

The text library search system may be specifically configured to: perform ranking based on at least one feature of a URL weight, an offset weight, and a question matching degree, wherein the URL weight is a weight of a URL link of a site to which a document where the candidate answer is located belongs, the offset weight is a distance coefficient of the candidate answer with respect to a keyword in the question in different candidate segments, and the question matching degree is a semantic matching degree between the candidate answer and the type of the opinion of the question.

In the above mentioned solution, the central control system 510 may be specifically configured to:

filter the result of the search processing by using intra-domain knowledge; and return the answer based on the result of the filtering.

As a preferable implementation, the central control system 510 may be specifically configured to:

perform a second ranking operation of the result of the filtering; and return the ranked result of the filtering.

Further, the central control system 510 may be specifically configured to: rank the result of the filtering by using a supervised machine learning system.

As another preferable implementation, the central control system 510 may be specifically configured to:

perform a third ranking operation of the result of the filtering; and return the ranked result of the filtering.

Further, the central control system 510 may be specifically configured to:

validate a matching degree between the candidate answer and the question; and rank the candidate answers based on the matching degree.

The system for implementing intelligent QA that is provided by this embodiment of the present invention can perform the method for implementing intelligent QA that is provided by any embodiment of the present invention, has corresponding functional modules for performing the method, and has beneficial effects.

Sixth Embodiment

This embodiment provides a non-volatile computer storage medium. The computer storage medium stores one or more modules which when executed by a device that performs a method for implementing intelligent QA, cause the device to perform the following operations:

receiving a query question;

performing a semantic analysis of the question;

performing corresponding search processing for the question based on a result of the semantic analysis, wherein the search processing includes search processing performed for the question by at least one of a semantic relationship mining system, a text library search system, a knowledge base search system, and a question and answer library search system; and returning an answer based on a result of the search processing.

When the modules stored in the above-mentioned storage medium are executed by the device, performing the semantic analysis of the question may preferably include:

identifying a focus, an opinion, and a type of the opinion of the question.

When the modules stored in the above-mentioned storage medium are executed by the device, the method may further include, after the type of the opinion of the question is identified:

performing normalization processing on the type of the opinion of the question.

When the modules stored in the above-mentioned storage medium are executed by the device, performing the corresponding search processing for the question based on the result of the semantic analysis may preferably include:

performing search processing for the question by the semantic relationship mining system if the analyzed question has a structural dependency type; otherwise, performing search processing for the question by the text library search system, the knowledge base search system, and the question and answer library search system.

When the modules stored in the above-mentioned storage medium are executed by the device, performing search processing for the question by the semantic relationship mining system may preferably include:

searching a ternary relationship library for an answer to the question.

When the modules stored in the above-mentioned storage medium are executed by the device, the ternary relationship library may be established by:

performing a grammatical analysis of an original web page in a network to obtain a sentence having a dependency relationship;

extracting nodes of the dependency relationship to obtain a ternary relationship triple; and validating reasonableness of the ternary relationship triple, and establishing the ternary relationship library by using the ternary relationship triple the reasonableness of which is validated.

When the modules stored in the above-mentioned storage medium are executed by the device, the method may further include, before the sentence having the dependency relationship is obtained:

removing content in brackets in the sentence.

When the modules stored in the above-mentioned storage medium are executed by the device, the method may further include, before the ternary relationship triple is obtained:

adding at least one of a subject, an adverbial, and an object that the sentence having the dependency relationship lacks.

When the modules stored in the above-mentioned storage medium are executed by the device, performing the search processing for the question by the text library search system may preferably include:

performing a search to obtain a document set related to the question;

searching the document set for a candidate segment, wherein the candidate segment include a candidate answer; and extracting the candidate answer from the candidate segment, and performing a first ranking operation.

When the modules stored in the above-mentioned storage medium are executed by the device, performing the first ranking operation may include:

performing ranking based on at least one feature of a uniform resource locator (URL) weight, an offset weight, and a question matching degree, wherein the URL weight is a weight of a URL link of a site to which a document where the candidate answer is located belongs, the offset weight is a distance coefficient of the candidate answer with respect to a keyword in the question in different candidate segments, and the question matching degree is a syntactic matching degree between the candidate answer and the type of the opinion of the question.

When the modules stored in the above-mentioned storage medium are executed by the device, returning the answer based on the result of the search processing may include:

filtering the result of the search processing by using intra-domain knowledge; and returning the answer based on a result of the filtering.

When the modules stored in the above-mentioned storage medium are executed by the device, returning the answer based on the result of the filtering may include:

performing a second ranking operation of the result of the filtering; and returning the ranked result of the filtering.

When the modules stored in the above-mentioned storage medium are executed by the device, performing the second ranking operation of the result of the filtering may include:

ranking the result of the filtering by using a supervised machine learning model.

When the modules stored in the above-mentioned storage medium are executed by the device, returning the answer based on the result of the filtering may include:

performing a third ranking operation of the result of the filtering; and returning the ranked result of the filtering.

When the modules stored in the above-mentioned storage medium are executed by the device, performing the third ranking operation of the result of the filtering may include:

validating a matching degree between the candidate answer and the question; and ranking the candidate answer based on the matching degree.

Seventh Embodiment

Figure 6:
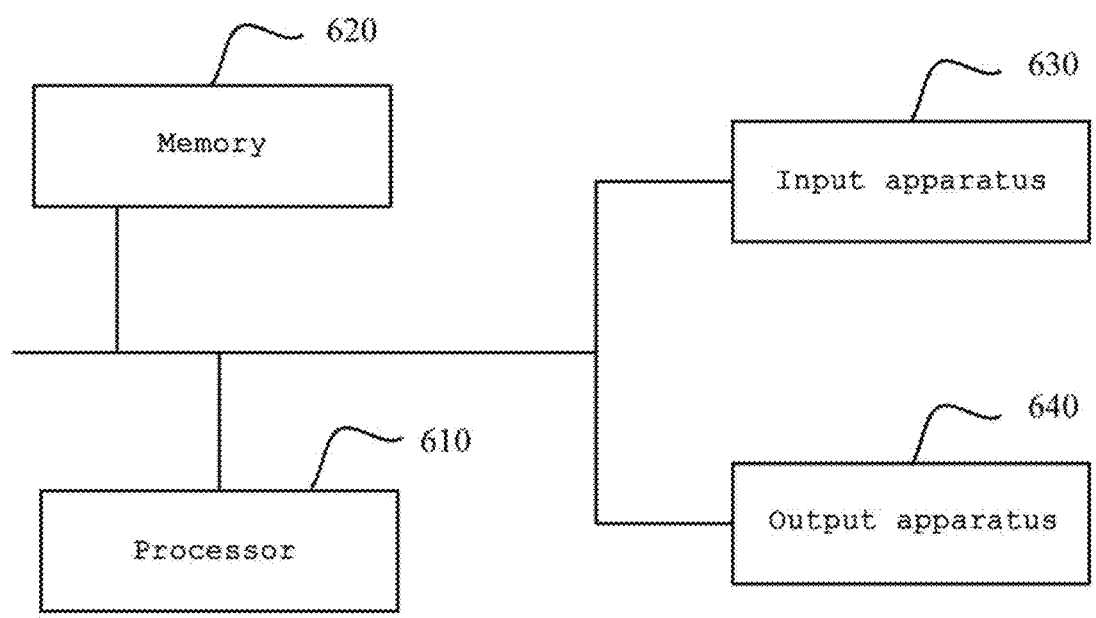
FIG. 6 is a schematic structural hardware diagram of a device for executing a method for implementing intelligent QA according to a seventh embodiment of the present invention.

FIG. 6 is a schematic structural diagram of hardware of a device for executing a method for implementing intelligent QA according to a seventh embodiment of the present invention.

The device includes:

one or more processors 610, and only one processor 610 is shown in FIG. 6 as an example;

a memory 620; and one or more modules.

The device may further include: an input apparatus 630 and an output apparatus 640. The processor 610, the memory 620, the input apparatus 630, and the output apparatus 640 in the device may be connected by a bus or in other manners. FIG. 6 uses bus connection as an example.

As a computer readable storage medium, the memory 620 may be configured to store software programs, computer executable programs and modules, such as program instructions/modules corresponding to the method for implementing intelligent QA in the embodiments of the present invention (for example, the central control system 510, the question analysis system 520, and the back-end system 530 in the system for implementing intelligent QA shown in FIG. 5). The processor 610 executes the software programs, instructions, and modules stored in the memory 620, so as to perform various functional applications and data processing of a server, i.e., implement the method for implementing intelligent QA in the above mentioned method embodiment.

The memory 620 may include a program storage area and a data storage area. The program storage area may store an operating system and an application required by at least one function; the data storage area may store data that is created based on the use of a terminal device, etc. In addition, the memory 620 may include a high speed random access memory, and may further include a non-volatile memory, for example, at least one disk storage device, a flash memory device, or other non-volatile solid-state storage device. In some examples, the memory 620 may further include memories disposed remotely with respect to the processor 610, and these memories may be connected to the terminal device through a network. Examples of the above-mentioned network include, but are not limited to, the Internet, an enterprise intranet, a local area network, a mobile communication network, and combinations thereof.

The input apparatus 630 may be configured to receive number or character information that is input, and generate a key signal input related to the user settings and functional control of the terminal. The output apparatus 640 may include a display device such as a display screen.

The one or more modules are stored in the memory 620, and when executed by the one or more processors 610, perform the following operations:

receiving a query question;

performing a semantic analysis of the question;

performing corresponding search processing for the question based on a result of the semantic analysis, wherein the search processing includes search processing performed for the question by at least one of a semantic relationship mining system, a text library search system, a knowledge base search system, and a question and answer library search system; and returning an answer based on a result of the search processing.

Further, performing the semantic analysis of the question may include:

identifying a focus, an opinion, and a type of the opinion of the question.

Further, the method may further include, after the type of the opinion of the question is identified:

performing normalization processing on the type of the opinion of the question.

Further, performing the corresponding search processing for the question based on the result of the semantic analysis may include:

performing search processing for the question by the semantic relationship mining system if the type of the analyzed question is a structural dependency type; otherwise, performing search processing for the question by the text library search system, the knowledge base search system, and the question and answer library search system.

Further, performing the search processing for the question by the semantic relationship mining system may include:

searching a ternary relationship library for an answer to the question.

Further, the ternary relationship library may be established by:

performing a grammatical analysis of an original web page in a network to obtain a sentence having a dependency relationship;

extracting nodes of the dependency relationship to obtain a ternary relationship triple; and validating reasonableness of the ternary relationship triple, and establishing the ternary relationship library by using the ternary relationship triple the reasonableness of which is validated.

Further, the method may further include, before the sentence having the dependency relationship is obtained:

removing content in brackets in the sentence.

Further, the method may further include, before the ternary relationship triple is obtained:

adding at least one of a subject, an adverbial, and an object that the sentence having the dependency relationship lacks.

Further, performing the search processing for the question by the text library search system may include:

performing a search to obtain a document set related to the question;

searching the document set for a candidate segment, wherein the candidate segment includes a candidate answer; and extracting the candidate answer from the candidate segment, and performing a first ranking operation.

Further, performing the first ranking operation may include:

performing ranking based on at least one feature of a uniform resource locator (URL) weight, an offset weight, and a question matching degree, wherein the URL weight is a weight of a URL link of a site to which a document where the candidate answer is located belongs, the offset weight is a distance coefficient of the candidate answer with respect to a keyword in the question in different candidate segments, and the question matching degree is a syntactic matching degree between the candidate answer and the type of the opinion of the question.

Further, returning the answer based on the result of the search processing may include:

filtering the result of the search processing by using intra-domain knowledge; and returning the answer based on a result of the filtering.

Further, returning the answer based on the result of the filtering may include:

performing a second ranking operation of the result of the filtering; and returning the ranked result of the filtering.

Further, performing the second ranking operation of the result of the filtering may include:

ranking the result of the filtering by using a supervised machine learning model.

Further, returning the answer based on the result of the filtering may include:

performing a third ranking operation of the result of the filtering; and returning the ranked result of the filtering.

Further, performing the third ranking operation of the result of the filtering may include:

validating a matching degree between the candidate answer and the question; and ranking the candidate answer based on the matching degree.

According to the foregoing description of the embodiments, it should be clear to those skilled in the art that the present invention may be implemented by means of software and necessary general hardware, and certainly may be implemented by hardware. In most cases, the former implementation is preferred. Based on such an understanding, the technical solutions in the present invention essentially, or the part contributing to the prior art may be implemented in the form of a software product. The computer software product may be stored in a computer readable storage medium, such as a floppy disk, a Read-Only Memory (ROM), a Random Access Memory (RAM), a flash, a magnetic disk, or an optical disk of a computer, and includes several instructions which causes a computer device (which may be a personal computer, a server, a network device, etc.) to perform the method described in the embodiments of the present invention.

It should be noted that, in the above mentioned embodiments for the systems for implementing intelligent QA, the systems are divided based on functional logic only, but the present invention is not limited to the above division as long as corresponding functions can be implemented. In addition, the specific names of the functional units are used only for distinguishing one from another, but do not intend to limit the scope of protection of the present invention.

Described above are merely exemplary embodiments of the present invention, but the protection scope of the present invention is not limited thereto. Any variations or substitutions readily conceivable to those skilled in the art within the disclosed technical scope of the present invention shall fall into the protection scope of the present invention. Accordingly, the protection scope of the present invention is defined by the protection scope of the claims.

What is claimed is:

1. A method for implementing intelligent question answering, comprising:

receiving a query question;

performing a semantic analysis of the query question by analyzing the query question to obtain a dependency syntax tree that describes a dependency relationship between various portions of the query question;

performing corresponding search processing for the query question based on a result of the semantic analysis, the corresponding search processing comprising search processing performed for the query question by a text library search system; and returning an answer based on a result of the corresponding search processing, wherein performing the search processing for the query question by the text library search system comprises:

performing a search to obtain a document set related to the query question;

calculating document correlation of documents in the document set;

searching the document set for a candidate segment based on the document correlation, the candidate segment comprising a candidate answer; and extracting the candidate answer from the candidate segment, and performing a first ranking operation;

wherein performing the first ranking operation comprises:

performing ranking based on at least one feature of a uniform resource locator (URL) weight, and an offset weight, the URL weight being a weight of a URL link and a site to which a document where the candidate answer is located belongs, and the offset weight being a distance coefficient of the candidate answer with respect to a keyword in the query question in different candidate segments.

2. The method according to claim 1, wherein the performing the semantic analysis of the query question comprises:

identifying a focus, an opinion, and a type of the opinion of the query question.

3. The method according to claim 2, further comprising, after the type of the opinion of the query question is identified:

performing normalization processing on the type of the opinion of the query question.

4. The method according to claim 1, wherein the returning the answer based on the result of the corresponding search processing comprises:

filtering the result of the corresponding search processing by using intra-domain knowledge; and returning the answer based on a result of the filtering.

5. The method according to claim 4, wherein the returning the answer based on the result of the filtering comprises:

performing a second ranking operation of the result of the filtering; and returning the ranked result of the filtering.

6. The method according to claim 5, wherein the performing the second ranking operation of the result of the filtering comprises:

ranking the result of the filtering by using a supervised machine learning model.

7. The method according to claim 5, wherein the returning the answer based on the result of the filtering comprises:

performing a third ranking operation of the result of the filtering; and returning the ranked result of the filtering.

8. The method according to claim 7, wherein the performing the third ranking operation of the result of the filtering comprises:
    validating a matching degree between the candidate answer and the query question; and
    ranking the candidate answer based on the matching degree.

9. A system for implementing intelligent question answering, comprising:
    at least one processor; and
    a memory storing instructions, which when executed by the at least one processor, cause the at least one processor to perform operations, the operations comprising:
        receiving a query question;
        performing a semantic analysis of the query question by analyzing the query question to obtain a dependency syntax tree that describes a dependency relationship between various portions of the query question;
        performing corresponding search processing for the query question based on a result of the semantic analysis, the corresponding search processing comprising search processing performed for the query question by a text library search system; and
        returning an answer based on a result of the corresponding search processing,
        wherein the performing the search processing for the query question by the text library search system comprises:
        performing a search to obtain a document set related to the query question;
        calculating document correlation of documents in the document set;
        searching the document set for a candidate segment based on the document correlation, the candidate segment comprising a candidate answer; and
        extracting the candidate answer from the candidate segment, and performing a first ranking operation;
    wherein performing the first ranking operation comprises:
        performing ranking based on at least one feature of a uniform resource locator (URL) weight, and an offset weight, the URL weight being a weight of a URL link and a site to which a document where the candidate answer is located belongs, and the offset weight being a distance coefficient of the candidate answer with respect to a keyword in the query question in different candidate segments.

10. The system according to claim 9, wherein performing the semantic analysis of the query question analysis comprises:
    identifying a focus, an opinion, and a type of the opinion of the query question.

11. The system according to claim 10, wherein the operations further comprise:
    performing normalization processing on the type of the opinion of the query question after the type of the question is identified.

12. A non-volatile computer storage medium storing one or more modules, the one or more modules which when executed by a device, cause the device to perform a method for implementing intelligent question answering, the method comprising:
    receiving a query question;
    performing a semantic analysis of the query question by analyzing the query question to obtain a dependency syntax tree that describes a dependency relationship between various portions of the query question;
    performing corresponding search processing for the query question based on a result of the semantic analysis, the corresponding search processing comprising search processing performed for the query question by a text library search system; and
    returning an answer based on a result of the corresponding search processing,
    wherein the performing the search processing for the query question by the text library search system comprises:
    performing a search to obtain a document set related to the query question;
    calculating document correlation of documents in the document set;
    searching the document set for a candidate segment based on the document correlation, the candidate segment comprising a candidate answer; and
    extracting the candidate answer from the candidate segment, and performing a first ranking operation;
    wherein performing the first ranking operation comprises:
        performing ranking based on at least one feature of a uniform resource locator (URL) weight, and an offset weight, the URL weight being a weight of a URL link and a site to which a document where the candidate answer is located belongs, and the offset weight being a distance coefficient of the candidate answer with respect to a keyword in the query question in different candidate segments.

* * * * *